April 29, 1930.　　　F. W. BOMMER　　　1,756,171
PROCESS OF MAKING RUBBER THREAD
Filed Sept 2. 1927
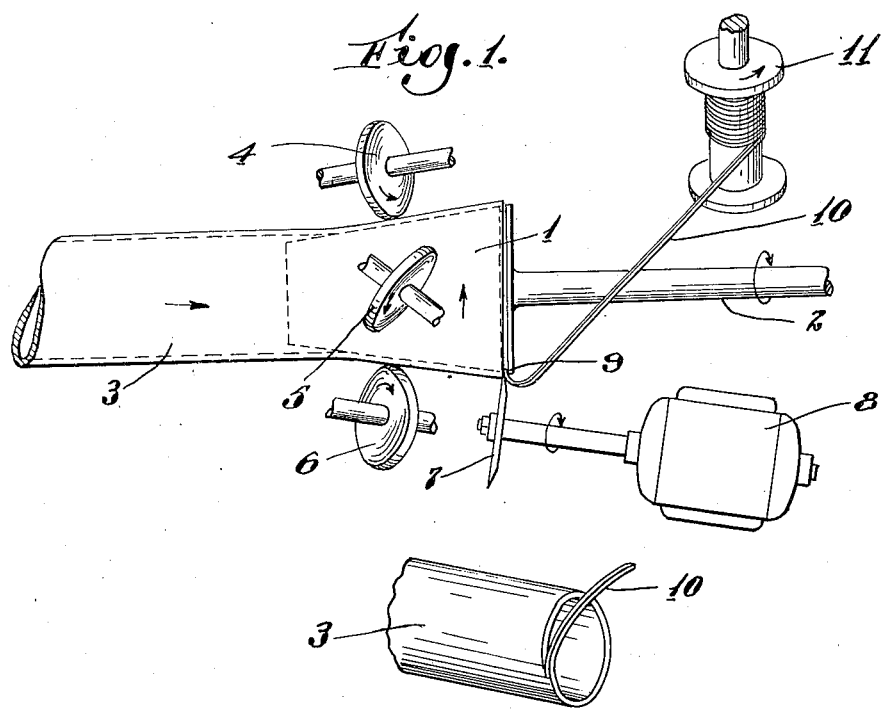
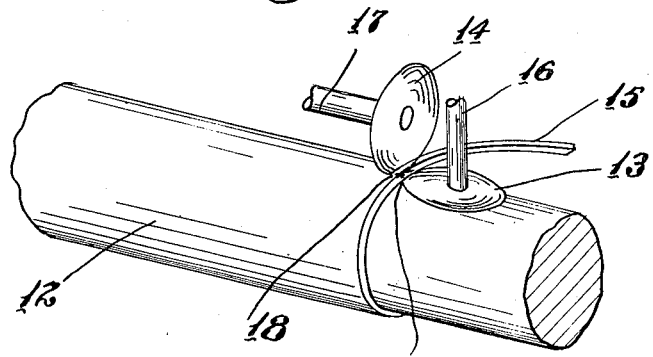
Inventor
Fred W. Bommer
by James R. Hodder
Attorney Patented Apr. 29, 1930

1,756,171

UNITED STATES PATENT OFFICE

FRED W. BOMMER, OF EVERETT, MASSACHUSETTS

PROCESS OF MAKING RUBBER THREAD

Application filed September 2, 1927. Serial No. 217,289.

My present invention relates to a novel method of forming rubber thread, preferably by cutting the same from cylindrical or tubular rubber stock, either hollow or solid.

In the prior methods of manufacturing rubber thread or string for use in the various arts, particularly in making such articles for the winding of golf balls or the like, great difficulty has been experienced due to the inherent peculiarities of rubber and the handling of the same. Thus, in making continuous thread or cords of rubber, when cut from flat strips, it was necessary to unite the cut portions to make a continuous length. Because of the inherent elasticity and peculiar properties of rubber stock, it has been difficult to cut the same in a uniform manner to produce the resultant even tensioned thread or string of indeterminate length. A further difficulty has been that the cutting of such rubber into narrow strips or threads is necessarily made while the rubber is under some tension, and after the tension is released it is not uniform in thickness, diameter, size, or resiliency.

By my present invention I have devised a simple, efficient, and novel method of cutting rubber thread or cord of great length, and in a continuous and expeditious manner. I have discovered that, by using rubber stock in cylindrical form such, for example, as a hollow tube, I can cut and form under appropriate tension and at great speed indefinite length of rubber of any desired thickness, tension, or contour forming cross section which may be desired. The production of rubber in tubular form is peculiarly inexpensive, and presents an advantageous method of subsequent handling. Furthermore, I can utilize inner tubes from automobile tires, which usually give excellent stock at a minimum of cost.

By my present invention I provide any suitable means which will feed the rubber such, for example, as a rubber tube, onto a suitable tensioning member, such as a conical shaped mandrel or the like, and thereupon cut a strip spirally therefrom, while the rubber tube is suitable held under tension, and properly fed or moved forwardly to maintain the tension, while the cutting instrumentalites may be positioned, adjusted, and arranged to cut any desired width or thickness from the open end of the tube at the tensioned point on the mandrel. Preferably, also, I form the mandrel with a cooperating groove or the like to facilitate a cutting action, and afford a guide and shear-like member to aid the cutting tool in its action. The spiral strip thus cut is preferably conducted to a winding spindle or spool, rotated at appropriate speed to facilitate the cutting action and, preferably, also, to keep the cut portion at substantially equivalent tension to that from which the strip is cut.

In carrying out my invention in modified form I can utilize a pair of cutting members, each individually adjustable, to cut from a tube or from a solid cylinder a thread or cord-like spiral strip of predetermined cross section or of less thickness than that of the tube from which the thread is to be cut.

Further novel features, combinations, and advantages will be hereinafter pointed out and claimed.

Referring to the drawings, illustrating a preferred embodiment of my invention.

Fig. 1 is a diagrammatic plan view showing a rubber tube in the process of being converted into rubber thread;

Fig. 2 is a perspective view of a fragment of rubber tubing;

Fig. 3 is a perspective view of a solid cylinder of rubber in the process of being cut into rubber thread.

Referring to the method of Figs. 1 and 2, and as shown in the drawings, 1 designates a mandrel revolved by the shaft 2 shown in fragmentary form and driven by any suitable motor or source of power. Over this mandrel 1 is fed rubber tubing 3 which is forced up onto the mandrel 1 by the feeding rollers 4, 5, and 6, shown diagrammatically, to the position of the cutter 7, rotated by the motor 8. The cutter 7 cuts the tubing 3 by extending into the groove 9 in the mandrel 1, thus forming the rubber thread 10 which is thence wound onto the revolving spool 11 as fast as it is made.

The mandrel 1 is cone shaped so as to allow the tubing 3 to be stretched sufficiently to assure a better cutting operation. The feeding rollers 4, 5, and 6 feed the tubing 3 onto the revolving mandrel 1 as fast as it is needed, the cutter 7 thereby cutting always in the same position and groove. The width of the thread may be controlled by the speed of the feeding action, and the shape of the thread may be controlled by regulating the angle of the cutter.

The respective speeds of the revolving parts are all in harmony, and rotate in the direction of the arrows as shown in the drawings. The tension on the thread is regulated so as to wind the thread on the spool at the right degree of stretch.

Referring to the modification shown in Fig. 3, I have devised a method for cutting rubber thread from solid rubber cylinders by the cutting action of two adjacent cooperating cutting wheels. Numeral 12 designates any solid rubber cylinder, while the cutting wheels 13 and 14 are so arranged as to cooperate, the wheel 13 cutting the cylinder 12 horizontally at 18; the wheel 14 cutting vertically at 19, said wheels 13 and 14 being rotatably mounted on shafts 16 and 17 respectively, and connected with any suitable or convenient source or sources of power.

The cylinder is revolved and fed forward by any suitable means relatively as fast as the rubber thread is cut, thus assuring a continuous and uninterrupted movement. This feature of utilizing two cutting wheels or instrumentalities may also be applied to rubber tubing, if desired to cut a thread of less thickness than the thickness of said tube.

It will thus be seen that my invention provides a novel, efficient method of forming rubber strips, cord or thread of any desired diameter, contour, and length by cutting the same from tubular stock, or from solid cylindrical stock, by one or more cutting instrumentalities, automatically and continuously feeding the same forward in position, and maintaining the rubber stock under suitable tension and winding it up on spools for future use. I believe that this method is distinctly new, and I therefore claim the same herein broadly.

Having thus described my invention, what I claim as new is:

1. The method of forming strips, cord or thread comprising, providing an elastic tube of rubber or like elastic material, applying a cutter to the periphery of the tube near an end thereof, maintaining the end of the tube at the cutter abnormally streched and distended with relation to the distention of the rest of the tube, and simultaneously rotating the tube and feeding the distended end thereof toward the cutter to remove a continuous, helical strip or thread therefrom.

2. The method of forming strips, cord or thread comprising, providing an elastic tube of rubber or like elastic material, applying a cutter to the periphery of the tube near an end thereof, cutting a continuous strip spirally therefrom while maintaining the tube stretched and distended at the cutter, and withdrawing the severed strip under tension to stretch the same at the cutter.

3. The method of forming strips, cord or thread comprising, providing an elastic tube of rubber or like elastic material, applying a cutter to the periphery of an end of the tube, maintaining the end at the cutter abnormally stretched and distended with relation to the rest of the tube, rotating the tube beneath the cutter, forcibly engaging the distended end of the tube to feed the same toward the cutter, cutting a continuous strip spirally therefrom and withdrawing the severed strip under tension to stretch it at the cutter.

4. The method of forming strips, cord or thread comprising, providing an elastic tube of rubber or like elastic material, applying a cutter to the periphery of the tube near an end thereof, maintaining the end of the tube at the cutter abnormally stretched or distended with relation to the distention of the rest of the tube, rotating the tube beneath the cutter, and simultaneously engaging the distended end of the tube and feeding the same toward the cutter to remove a continuous, helical strip therefrom.

In testimony whereof, I have signed my name to this specification.

FRED W. BOMMER.